(12) United States Patent
Hwang et al.

(10) Patent No.: US 12,554,127 B2
(45) Date of Patent: Feb. 17, 2026

(54) CAMERA MODULE

(71) Applicant: LG INNOTEK CO., LTD., Seoul (KR)

(72) Inventors: Sun Min Hwang, Seoul (KR); Min Woo Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 60 days.

(21) Appl. No.: 18/723,159

(22) PCT Filed: Dec. 14, 2022

(86) PCT No.: PCT/KR2022/020327
§ 371 (c)(1),
(2) Date: Jun. 21, 2024

(87) PCT Pub. No.: WO2023/121126
PCT Pub. Date: Jun. 29, 2023

(65) Prior Publication Data
US 2025/0102791 A1    Mar. 27, 2025

(30) Foreign Application Priority Data

Dec. 21, 2021  (KR) .......................... 10-2021-0184397

(51) Int. Cl.
*G02B 27/00* (2006.01)
*G03B 17/02* (2021.01)
(Continued)

(52) U.S. Cl.
CPC ......... *G02B 27/0006* (2013.01); *G03B 17/02* (2013.01); *G03B 30/00* (2021.01);
(Continued)

(58) Field of Classification Search
None
See application file for complete search history.

(56) References Cited

U.S. PATENT DOCUMENTS 11,714,336 B2 *  8/2023  Kim ...................... H04N 23/54
                                                                 396/535
2011/0249120 A1  10/2011  Bingle et al.
(Continued)

FOREIGN PATENT DOCUMENTS

JP        2021-33197 A       3/2021
KR    10-2015-0041409 A      4/2015
(Continued)

OTHER PUBLICATIONS

International Search Report dated Mar. 17, 2023 in International Application No. PCT/KR2022/020327.
(Continued)

*Primary Examiner* — Quan Pham
(74) *Attorney, Agent, or Firm* — Saliwanchik, Lloyd & Eisenschenk (57) ABSTRACT

A camera module comprises: a first body comprising an upper part, and a side part downwardly extending from the upper part; a lens module disposed in the first body and having the upper surface thereof facing the lower surface of upper body; a printed circuit board comprising an image sensor facing the lens module; and a heating member having one end thereof connected to the printed circuit board and the other end thereof disposed between the lens module and the upper part, wherein a groove facing the heating member is disposed in the lower surface of the upper part.

16 Claims, 6 Drawing Sheets

(51) Int. Cl.
*G03B 30/00* (2021.01)
*H04N 23/51* (2023.01)
*H04N 23/52* (2023.01)
*H05K 7/20* (2006.01)

(52) U.S. Cl.
CPC ............ *H04N 23/51* (2023.01); *H04N 23/52* (2023.01); *H05K 7/20* (2013.01)

(56) References Cited

U.S. PATENT DOCUMENTS

| | | |
|---|---|---|
| 2019/0094484 A1 | 3/2019 | Hasegawa et al. |
| 2019/0137723 A1* | 5/2019 | Bernal .................... H04N 23/55 |
| 2019/0353987 A1* | 11/2019 | Choi ........................ B60R 11/04 |
| 2020/0271889 A1 | 8/2020 | Lee et al. |
| 2021/0199953 A1* | 7/2021 | Hong ...................... G02B 7/026 |
| 2021/0294066 A1 | 9/2021 | Hirata et al. |

FOREIGN PATENT DOCUMENTS

| | | |
|---|---|---|
| KR | 10-2018-0017887 A | 2/2018 |
| KR | 10-2243382 B1 | 4/2021 |
| WO | 2016/195403 A1 | 12/2016 |
| WO | WO-2019181122 A1 * | 9/2019 ............... G02B 7/02 |

OTHER PUBLICATIONS

Supplementary European Search Report dated Mar. 24, 2025 in European Application No. 22911759.3.

\* cited by examiner

CAMERA MODULE

CROSS-REFERENCE TO RELATED APPLICATIONS

This application is the U.S. national stage application of International Patent Application No. PCT/KR2022/020327, filed Dec. 14, 2022, which claims the benefit under 35 U.S.C. § 119 of Korean Application No. 10-2021-0184397, filed Dec. 21, 2021, the disclosures of each of which are incorporated herein by reference in their entirety.

TECHNICAL FIELD

The teachings in accordance with exemplary and non-limiting embodiments of this invention relate generally to a camera module.

BACKGROUND ART

In recent years, the popularization of automobiles has led to the rapid spread of automobiles across various classes and age groups.

The automobile is provided with a camera for a dash cam for protection of the vehicle or objective data of a traffic accident, a rear view camera for a vehicle that enables a driver to monitor a blind spot at the rear of the vehicle through a screen for safety when reversing the vehicle, and the like.

The camera may comprise a lens module, a lens holder supporting the lens module, and an image sensor for converting an image of a subject gathered in the lens module into an electrical signal. The housing forming the exterior of the camera may comprise an entirely enclosed structure to inhibit the internal components from being contaminated by foreign objects, including moisture.

Due to the nature of an automobile being placed outdoors, the interior and exterior temperatures of the automobile are subject to varying distributions depending on the time of year. For example, in summer, the indoor temperature may be higher than the outdoor temperature, and in winter, the temperature may drop to below freezing temperature. Therefore, due to rapid temperature changes, condensation, including frost, may form on the camera's components, including the lens and glass. This can result in unsatisfactory images or even product failure.

To solve this problem, it has been proposed to place heating wires on the lens and glass to transfer heat to the lens and glass to remove the frost. However, there is a problem that the heat transfer from the heating wire is not easy and the efficiency is low due to the phenomenon that the heat cools down quickly.

DETAILED DESCRIPTION OF INVENTION

Technical Subject

The present embodiment is to provide a camera module that facilitates heat transfer to the lens and glass and inhibits heat from escaping to the outside, thereby improving heating efficiency.

Technical Solution

In one general aspect of the present invention, there may be provided a camera module comprising:

a first body comprising an upper part, and a side part downwardly extending from the upper part;
a lens module disposed in the first body and having an upper surface thereof facing a lower surface of upper body; a printed circuit board comprising an image sensor facing the lens module; and
a heating member having one end thereof connected to the printed circuit board and the other end thereof disposed between the lens module and the upper part, wherein a groove facing the heating member is disposed in the lower surface of the upper part.

Preferably but not necessarily, the lower surface of the upper part may comprise an outer region, an inner region disposed on an inner side of the outer region, and a groove may be disposed between the outer region and the inner region.

Preferably but not necessarily, the first body may comprise a rib in contact with the heating member, disposed to connect the inner region with the outer region.

Preferably but not necessarily, the groove may be divided into a plurality of regions by the rib.

Preferably but not necessarily, the camera module may further comprise a sealing member disposed between a lower surface of the inner region and an upper surface of the lens module.

Preferably but not necessarily, a sealing member coupling groove may be disposed on the lower surface of the inner region, which is shaped to be recessed upwardly from the other regions so as to engage the sealing member.

Preferably but not necessarily, on the upper surface of the lens module, the region facing the sealing member may be provided with a staircase that protrudes upwardly from the other region.

Preferably but not necessarily, the heating member may comprise a heating part disposed between the upper surface and the lens module to provide heat; a terminal part connected to the printed circuit board; and a connection part connecting the heating part and the terminal part, the heating part having a ring-shaped cross-section.

Preferably but not necessarily, a radial length of the groove may be smaller than a radial length of the heating part.

Preferably but not necessarily, the camera module may further comprise a second body disposed below the first body, and a lens coupling part may be disposed in the center of the second body to which at least a portion of the lens module is coupled.

Advantageous Effect

The present embodiment inhibits heat generated by the heating member from being released to the outside through the groove and the sealing member, and thus has the advantage of making it easier to remove condensation from the lens due to improved heating efficiency.

BEST MODE

Hereinafter, exemplary embodiments of the present invention will be described in detail with reference to the accompanying drawings.

However, the present invention is not limited to the given exemplary embodiments described, but may be implemented in a variety of different forms, and one or more of components among the exemplary embodiments may be optionally combined or substituted between embodiments within the scope of the present invention.

Furthermore, terms (including technical and scientific terms) used in the embodiments of the present invention, unless expressly specifically defined and described, are to be interpreted in the sense in which they would be understood by a person of ordinary skill in the art to which the present invention belongs, and commonly used terms, such as dictionary-defined terms, are to be interpreted in light of their contextual meaning in the relevant art.

Furthermore, the terms used in the embodiments of the invention are intended to describe the embodiments and are not intended to limit the invention.

In this specification, the singular may include the plural unless the context otherwise requires, and references to "at least one (or more) of A and (or) B and C" may include one or more of any combination of A, B, and C that may be assembled.

In addition, the terms first, second, A, B, (a), (b), and the like may be used to describe components of embodiments of the invention. Such terms are intended only to distinguish one component from another, and are not intended to limit the nature or sequence or order of such components by such terms.

Furthermore, when a component is described as "connected," "coupled," or "attached" to another component, it can include cases where the component is "connected," "coupled," or "attached" to the other component directly, as well as cases where the component is "connected," "coupled," or "attached" to another component that is between the component and the other component.

Furthermore, when described as being formed or disposed "above" or "below" each component, "above" or "below" includes not only when two components are in direct contact with each other, but also when one or more other components are formed or disposed between the two components. Furthermore, when expressed as "above" or "below", it may include the meaning of upward as well as downward with respect to a single component.

As used herein, 'optical axis direction' is defined as the optical axis direction of the lens. On the other hand, 'optical axis direction' may correspond to 'up-down direction', 'z-axis direction', etc.

Hereinafter, the invention will be described in more detail with reference to the accompanying drawings.

Figure 1:
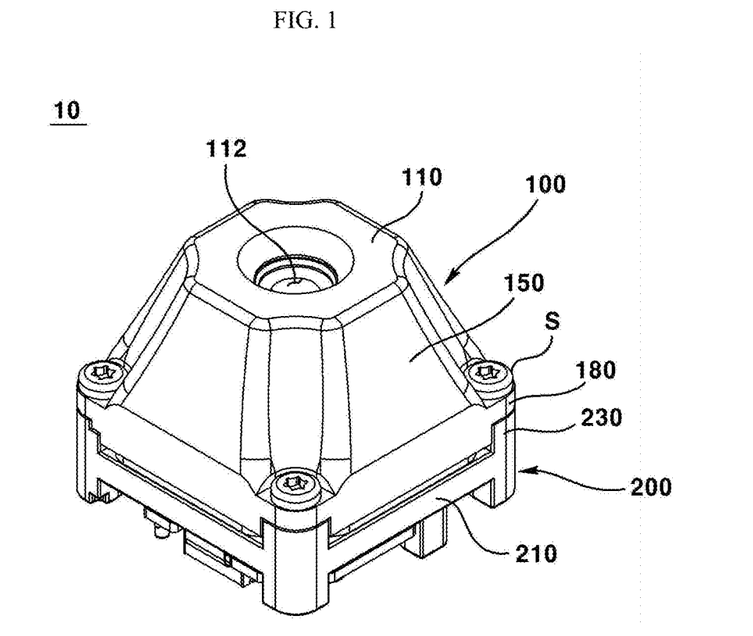
FIG. 1 is a perspective view illustrating the appearance of a camera module according to an embodiment of the present invention.
Figure 2:
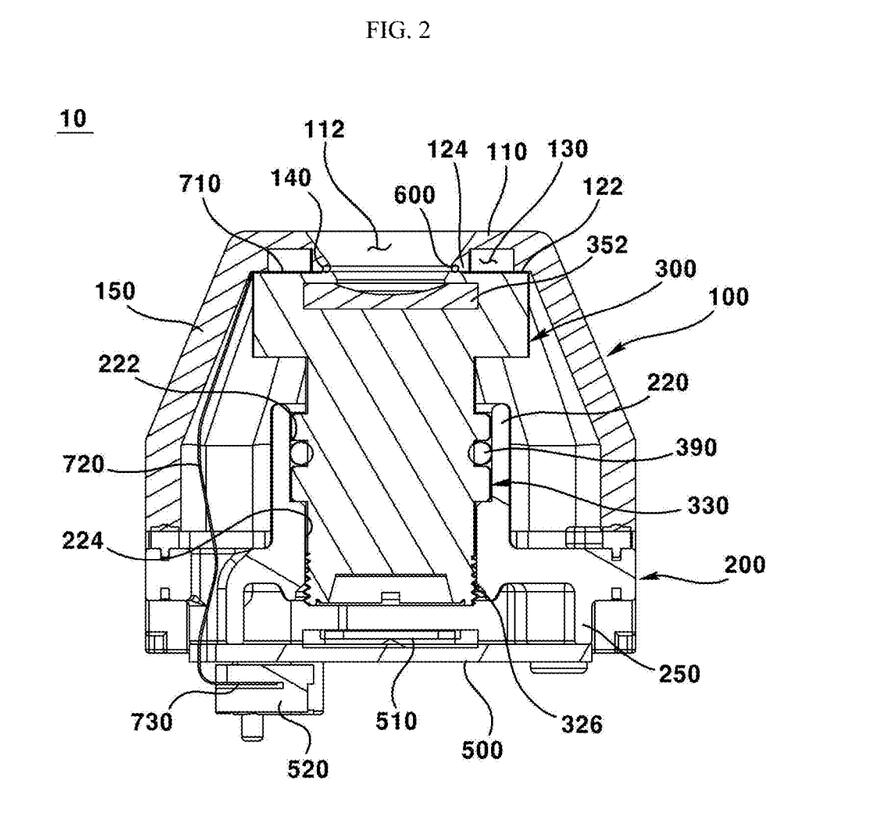
FIG. 2 is a cross-sectional view of a camera module according to an embodiment of the present invention.
Figure 3:
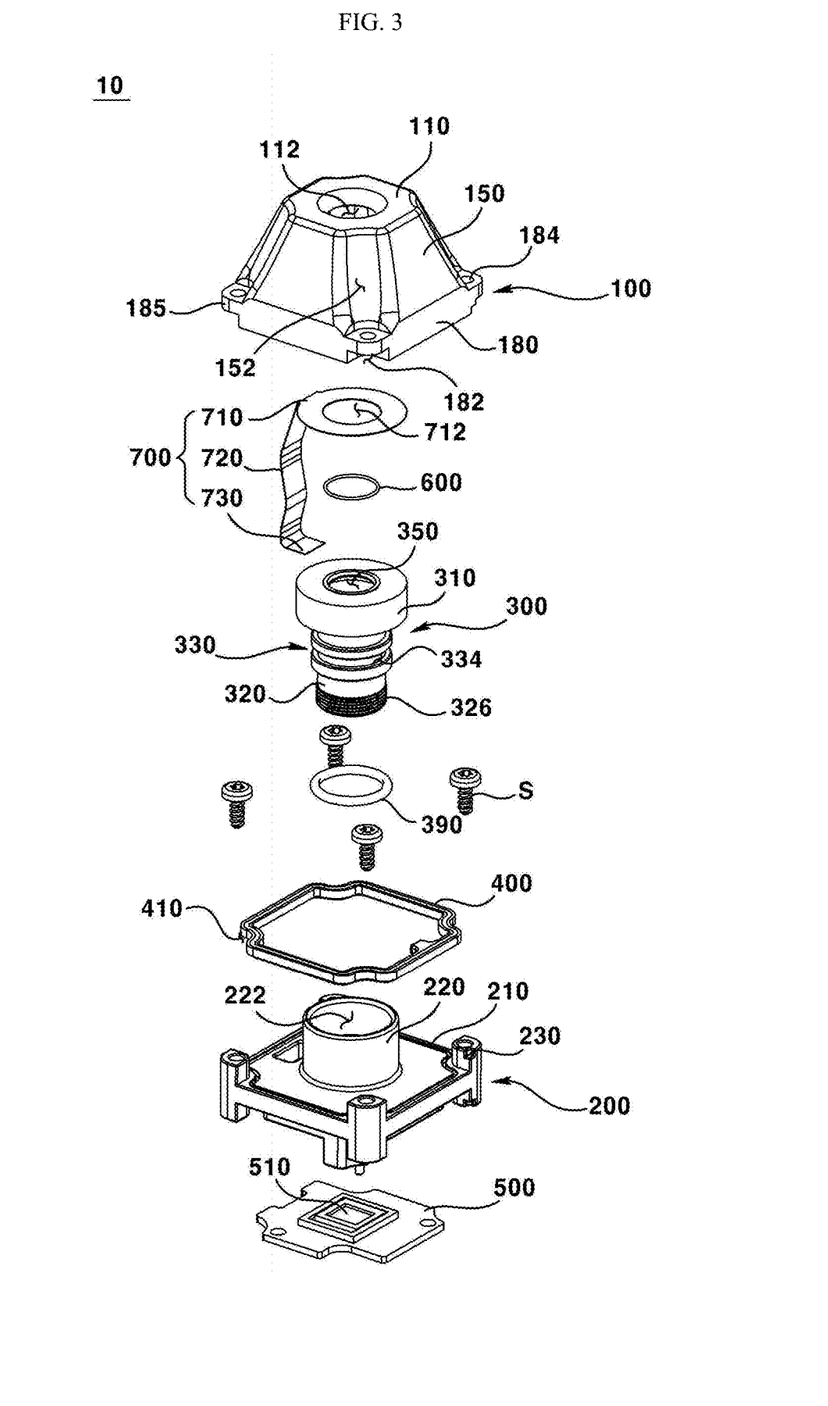
FIG. 3 is an exploded perspective view of a camera module according to an embodiment of the present invention.
Figure 4:
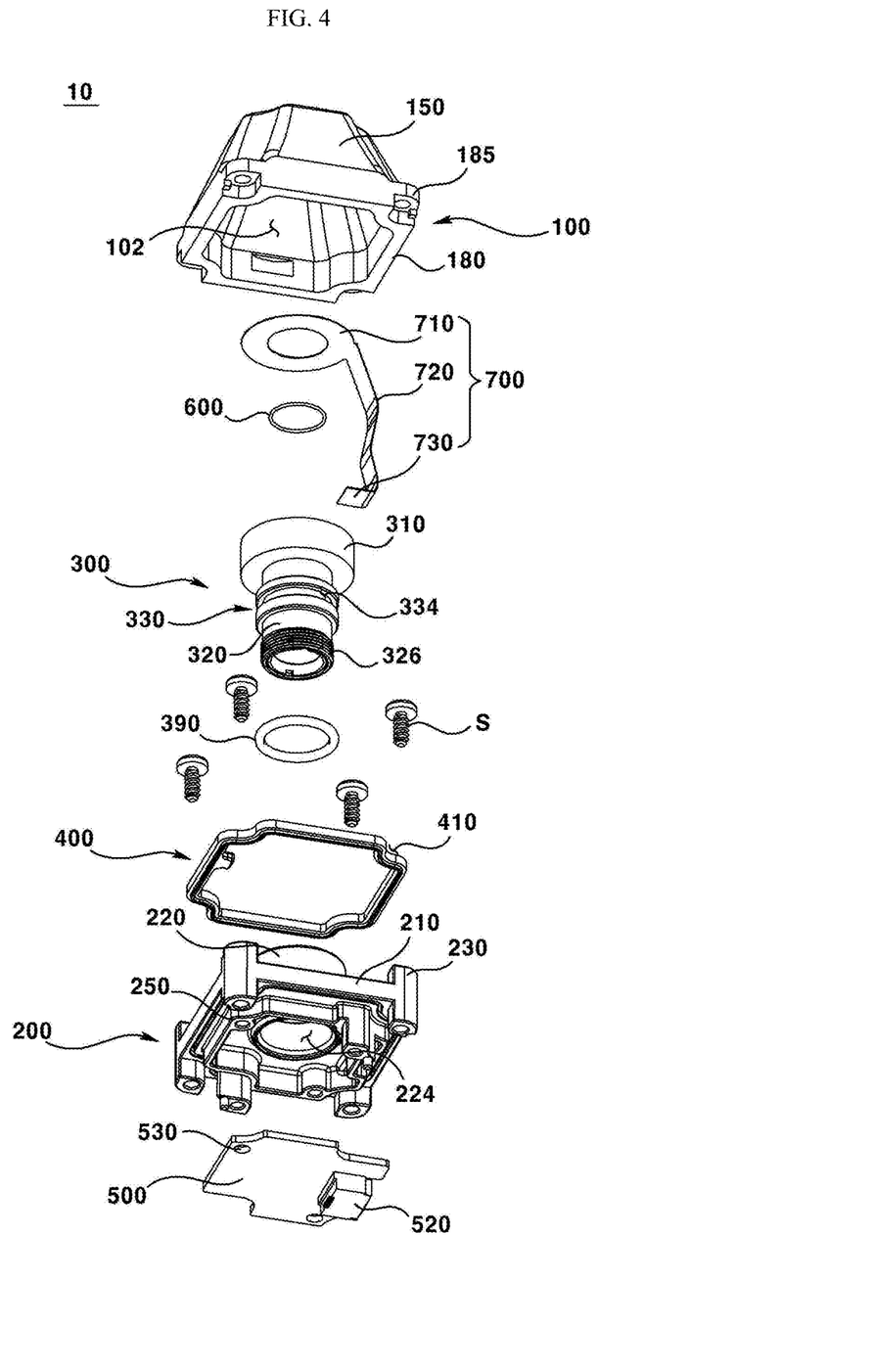
FIG. 4 is a drawing showing FIG. 3 from a different angle.
Figure 5:
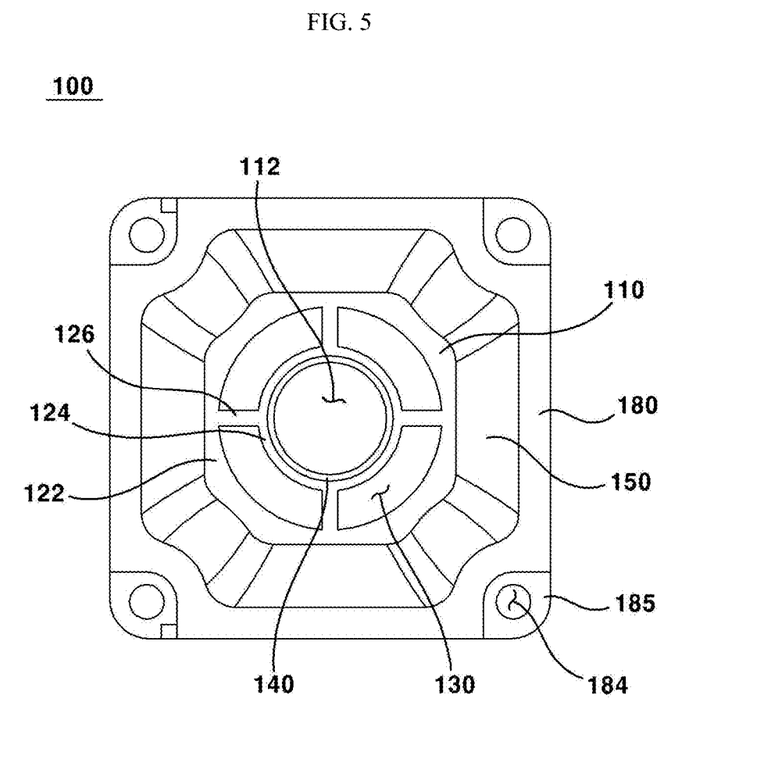
FIG. 5 is a top view of a cover according to an embodiment of the present invention, viewed from the bottom.
Figure 6:
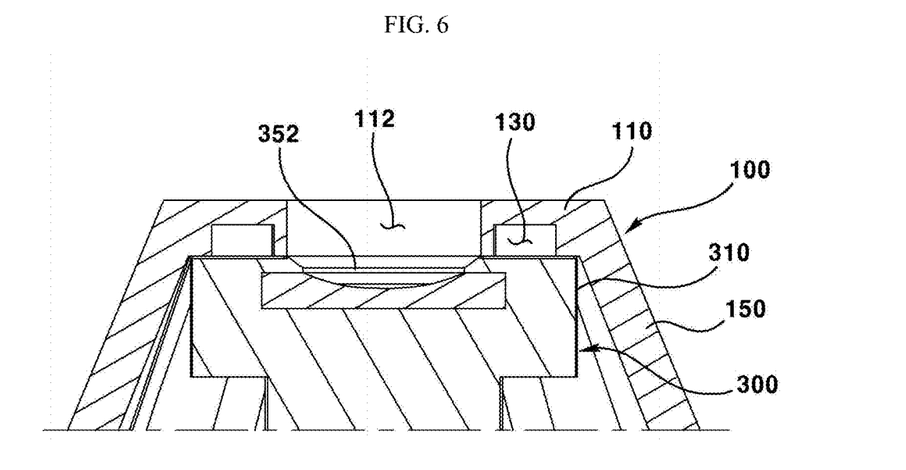
FIG. 6 is a conceptual diagram to illustrate a heating structure according to an embodiment of the present invention.
Figure 7:
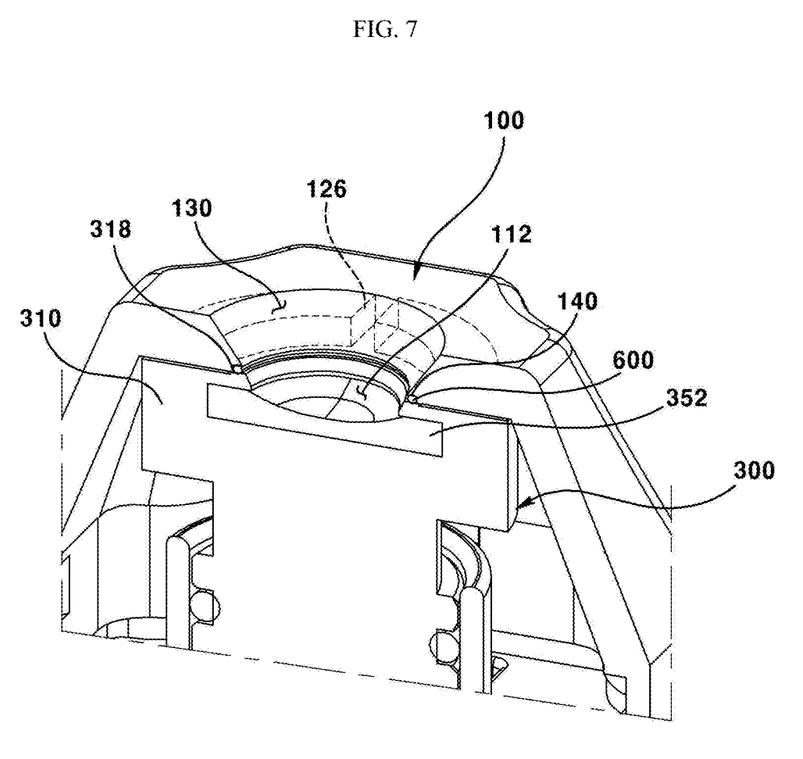
FIG. 7 is a drawing illustrating the coupling structure between the cover and the lens module, according to an embodiment of the present invention.

FIG. 1 is a perspective view illustrating the appearance of a camera module according to an embodiment of the present invention, FIG. 2 is a cross-sectional view of a camera module according to an embodiment of the present invention, FIG. 3 is an exploded perspective view of a camera module according to an embodiment of the present invention, FIG. 4 is a drawing showing FIG. 3 from a different angle, FIG. 5 is a top view of a cover according to an embodiment of the present invention, viewed from the bottom, FIG. 6 is a conceptual diagram to illustrate a heating structure according to an embodiment of the present invention, and FIG. 7 is a drawing illustrating the coupling structure between the cover and the lens module, according to an embodiment of the present invention.

Referring now to FIGS. 1 to 7, a camera module (10), according to an embodiment of the present invention, may be an in-vehicle camera module. The camera module (10) may be coupled to a vehicle. The camera module (10) may be used in one or more of a front camera, a side camera, a rear camera, and a black box of a vehicle. The camera module (10) may be disposed at the front of the vehicle. The camera module (10) may be disposed at the rear of the vehicle. The camera module (10) may be coupled to a windscreen of the vehicle. The camera module (10) may be coupled to the windscreen of the front or rear of the vehicle. The camera module (10) may be disposed on the side of a vehicle. The camera module (10) may photograph a subject and output an image to a display (not shown).

The camera module (10) may comprise a first body (100). The first body (100) may be named any one of a front body, an upper housing, a first housing, and a cover. The first body (100) may include an upper part (110), a side part (150), and a lower part (180). On the inner side of the first body (100), a space (102) may be formed in which the components within the camera module (10), including a lens module (300, to be described later), are disposed.

An upper part (110) may form the upper surface of the first body (100). In the center of the upper part (110), a hole (112) may be formed for exposing a lens (350) in the lens module (300) to the outside, to be described later. The hole (112) may be formed to extend downwardly from the upper surface of the upper part (110). The inner circumferential surface of the hole (112) may be formed to be sloped such that the cross-sectional area decreases towards the bottom.

The lower part (180) may form a lower surface of the first body (110). The lower part (180) may be disposed at a lower side, spaced apart from the upper part (110) in an optical axis direction. The cross-sectional area of the lower part (180) may be formed larger than the cross-sectional area of the upper part (110). The lower part (180) may have an oblong cross-sectional shape.

A coupling groove (182) may be formed on a lower surface of the lower part (180). The coupling groove (182) may be formed to be recessed upwardly from the lower surface of the lower part (180) than other regions. The coupling groove (182) may be plural, and may be disposed in corner regions of the lower part (180), respectively.

The lower part (180) may comprise a coupling part (185). The coupling part (185) may be disposed on an upper surface of the coupling groove (182). A lower surface of the coupling part (185) may form a lower surface of the coupling groove (182). The coupling part (185) may comprise a coupling hole (184) extending from the upper surface through the lower surface. The coupling hole (184) may be threaded with a screw S to be described later.

The side part (150) may be disposed to connect the upper part (110) and the lower part (180), and may form a side surface of the first body (100). The outer surface of the side part (150) may be sloped such that the cross-sectional area increases downwardly. The outer surface of the side part (150) may be disposed with a slope. A corner region of the outer surface of the side part (150) may be formed with a groove (152) that is more inwardly recessed than the other regions. The coupling part (185) and the coupling groove (182) may be disposed on an extension of the region in which the groove (152) is formed.

The camera module (10) may comprise a second body (200). The second body (200) may be named any one of a rear body, a lower housing, a second housing, a rear cover and a lens holder. The second body (200) may be formed as a rectangular shape with openings at the top and bottom. The second body (200) may be disposed below the first body (100). The second body (200) may be coupled to the first body (100). The second body (200) may be coupled with the first body (100) to form an inner space. The second body (200) may include a base (210) and a column part (230).

The base (210) may be formed in the shape of a plate having a predetermined thickness. The base (210) may have an oblong cross-sectional shape. The cross-sectional shape of the base (210) may be formed to correspond to the cross-sectional shape of the lower part (180) of the first body (100).

The base (210) may comprise a lens coupling part (220). The lens coupling part (220) may be shaped to protrude upwardly and downwardly from an upper surface and a lower surface of the base (210), respectively, and may include a space therein to receive at least a portion of the lens module (300). The space may have a circular cross-sectional shape. As shown in FIG. 2, the space may comprise a first space (222) and a second space (224) disposed at a lower surface of the first space (222), wherein a cross-sectional area of the first space (222) may be formed larger than a cross-sectional area of the second space (224).

A downwardly projecting protrusion (250) may be disposed on the lower surface of the base (210). The lower surface of the protrusion (250) may contact the upper surface of the printed circuit board (500, to be described later). A threaded hole may be formed on the lower surface of the protrusion (250), and a threaded hole may also be formed in a region of the printed circuit board (500) corresponding to the threaded hole. Thus, the upper surface of the printed circuit board 500 may be screwed to the lower surface of the protrusion 250.

The column parts (230) may be disposed in the corner regions of the base (210), respectively. Each of the column parts (230) may have a shape in which some portions project upwardly from the upper surface of the base (210) and other portions project downwardly from the lower surface of the base (210). The optical axis length of the column part (230) may be formed to be greater than the thickness of the base (210).

Upon coupling the first body (100) with the second body (200), at least a portion of the column part (230) may be engaged (coupled) in the coupling groove (182). A threaded hole is formed on the upper surface of the column part (230) into which the screw (S) is engaged, and the screw (S) may penetrate the coupling hole (184) of the first body (100) and screw into the threaded hole of the column part (230) of the second body (200).

The camera module (10) may comprise a lens module (300). The lens module (300) may be at least partially disposed on an inner side of the lens coupling part (220). The lens module (300) may comprise a lens barrel and at least one lens (350) disposed in a space within the lens barrel.

The lens barrel may include a top and bottom open space on an inner side, in which the lens (350) may be disposed. The lens barrel may include a first region (310) and a second region (320) disposed downstream of the first region (310). A cross-sectional area of the first region (310) may be formed larger than a cross-sectional area of the second region (320).

On an inner side of the first region (310), an outermost lens (352) may be disposed. Here, the outermost lens (352) may be defined as the uppermost lens of a plurality of lenses disposed in the optical axis direction. The outermost lens (352) may be a glass. A hole may be formed in the upper surface of the first region (310) to expose the outermost lens (352) upwardly.

The second region (320) may be disposed on a lower surface of the first region (310), at least a portion of which may be disposed in a space within the lens coupling part (220). The second region (320) may comprise a flange part (330) that protrudes outwardly from the other regions, and the flange part (330) may be formed with a larger cross-sectional area than the other regions. The flange part (330) may include a groove (334), into which the sealing member (390) may be engaged. The flange part (330) may be disposed within the first space (222), and the sealing member (390) may be disposed between an outer surface of the flange part (330) and an inner surface of the first space (222) to inhibit external debris (foreign objects) from entering downwardly. The sealing member (390) may have a ring-shaped cross-section.

A screw coupling part (326) may be formed on an outer surface of the second region (320) disposed downstream of the flange part (330). The screw coupling part (326) may comprise threads or thread grooves. The screw coupling part (326) may be disposed within the second space (224) and may be threadedly engaged to an inner surface of the second space (224). A threaded groove or thread for screw engagement may also be formed on an inner surface of the second space (224) facing the screw coupling part (326).

The camera module (10) may include a printed circuit board (500). The printed circuit board (500) may be referred to as a substrate. The printed circuit board (500) may be disposed on the lower surface of the second body (200). The printed circuit board (500) may be disposed on the lower surface of the base part (210) and may have an upper surface in contact with the lower surface of the protrusion (250).

On the upper surface of the printed circuit board (500), an image sensor (510) may be disposed. The image sensor (510) may be in alignment with the lens (350). The image sensor (510) and the lens (350) may be optically aligned. The optical axis of the lens (350) may coincide with the optical axis of the image sensor (510). An infrared ray filter (IR filter, not shown) may be disposed between the lens (350) and the image sensor (510).

A connector (520) may be disposed on the lower surface of the printed circuit board (500). The connector (520) may be coupled with a heating member (700, to be described later). Thus, power may be provided through the printed circuit board (500) to the heating member (700).

The camera module (10) may include an adhesive member (400). The adhesive member (400) may be disposed between the first body (100) and the second body (200). The adhesive member (400) may be disposed between a lower surface of the lower part (180) and an upper surface of the base (210). The adhesive member (400) may comprise an epoxy. Through the adhesive member (400), the first body (100) and the second body (200) may be mutually bonded. On an outer surface of the adhesive member (400), an avoidance part (410) may be formed in a region corresponding to the disposition region of the column part (230).

The camera module (10) may include a heating member (700). The heating member (700) may be disposed in a space (102) within the first body (100). The heating member (700) may be coupled to the upper surface of the lens module (300) at one end and the printed circuit board (500) at the other end. The heating member (700) may include a heating element that is powered to generate heat, and the heat generated by the heating member (700) may be transferred to the lens module (300) to inhibit condensation from forming on the lens (350) or glass.

The heating member (700) may include a heating part (710) coupled to the upper surface of the lens module (300), a terminal part (730) coupled to a connector (520) of the printed circuit board (500), and a connection part (720) connecting the heating part (710) to the terminal part (730).

The heating part (710) may have a ring-shaped cross-section. The heating part (710) may include a heating element that generates heat. The heating part (710) may be disposed between the upper surface of the lens module (300) and the lower surface of the upper part (110). An upper surface of the heating part (710) may be in contact with a lower surface of the upper part (110), and a lower surface of the heating part (710) may be in contact with the upper surface of the lens module (300).

In the present embodiment, the lower surface of the heating part (710) may be in contact with the upper surface of the lens barrel, such that heat provided by the heating part (710) is transferred through the lens barrel to the outermost lens (352), but this is not intended to be limiting; the heating part (710) may also be in direct contact with the upper surface of the outermost lens (352), or may be directly coupled to the surface of a glass (not shown) disposed on the upper surface of the lens module (300).

The terminal part (730) may be coupled to the connector (520), through which power may be provided from the printed circuit board (500) and/or control signals associated with the operation of the heating member (700) may be transmitted or received.

The connection part (720) may extend in the optical axis direction to connect the heating part (710) and the terminal part (730), and may have at least one bent region.

On the other hand, the first body (100) may include a groove (130) to inhibit heat generated by the heating member (700) from being released to the outside.

In detail, as shown in FIG. 5, an outer region (122) and an inner region (124) may be disposed on the lower surface of the upper part (110). The outer region (122) and the inner region (124) may be disposed radially spaced apart from each other, such that the lower surface may contact the upper surface of the lens module (300).

The groove (130) may be disposed between the outer region (122) and the inner region (124), and may have a shape that is recessed upwardly from the lower surface of the upper part (120) than the other regions. The groove (130) may be arranged to overlap at least a portion of the heating part (710) in the optical axis direction. The groove (130) may have a predetermined height in the optical axis direction. A radial length of the groove (130) may be formed smaller than a radial length of the heating part (710). Thus, the heat generated from the heating part (710) can be accommodated in the space in the groove (130), that is, the space in the groove (130) can function as an insulating layer, and has the advantage of inhibiting the heat provided by the heating member (700) from being lost to the outside through the groove (130).

On the other hand, the upper part (110) may comprise a rib (126) connecting the outer region (122) and the inner region (124). The lower surface of the rib (126) may form a plane with the lower surface of the upper part (110), or may project further downwardly, and may contact the upper surface of the heating part (710). Thus, the heating part (710) may be rigidly secured between the lower surface of the upper part (110) and the upper surface of the lens module (300).

The rib (126) may comprise a plurality of ribs, which may be spaced apart from each other along the circumferential direction, and through the ribs (126), the groove (130) may be divided into a plurality of regions. Each of the plurality of regions of the groove (130) may have an arc-shaped cross-section.

Additionally, the upper part (110) may comprise a sealing member coupling groove (140) that is recessed upwardly from the other regions. The sealing member coupling groove (140) may be formed on the lower surface of the inner region (124). The sealing member coupling groove (140) may be disposed along the perimeter of the hole (112). The bottom surface of the sealing member coupling groove (140) may be arranged in step with the lower surface of the upper part (110) in the optical axis direction.

Between the upper part (110) and the upper surface of the lens module (300), a sealing member (600) may be disposed. The sealing member (600) may have a ring-shaped cross-section. The sealing member (600) may be coupled to the sealing member coupling groove (140). On the upper surface of the lens module (300) facing optically axially with the sealing member coupling groove (140), a staircase (318, see FIG. 7) may be formed that protrudes upwardly from other areas. Thus, the sealing member (600) may be firmly secured within the sealing member coupling groove (140) via the upper surface of the staircase (318).

The sealing member (600) not only inhibits external foreign objects from entering the interior of the camera module (10) through the lower surface of the upper part (110) and the upper surface of the lens module (300), but is also disposed on the inner side of the groove (130) to inhibit the heat generated by the heating member (700) from being released to the outside.

According to the structure as described above, heat generated by the heating member (700) can be inhibited from being released to the outside through the groove (130) and the sealing member (600), thereby advantageously improving the heating efficiency and making it easier to remove condensation from the lens.

Although embodiments of the invention have been described above with reference to the accompanying drawings, it will be appreciated by those having ordinary skill in the technical field to which the invention belongs that the invention may be embodied in other specific forms without altering its technical ideas or essential features. It should therefore be understood that the embodiments described above are exemplary in all respects and are not intended to be limiting.

The invention claimed is:
1. A camera module comprising:
a first body comprising an upper part, and a side part downwardly extending from the upper part;
a lens module disposed in the first body and having an upper surface facing a lower surface of the upper part;
a printed circuit board comprising an image sensor facing the lens module; and
a heating member having one end thereof connected to the printed circuit board and an other end thereof disposed between the lens module and the upper part,
wherein a groove facing the heating member is disposed in the lower surface of the upper part, wherein the lower surface of the upper part comprises an outer region, an inner region disposed on an inner side of the outer region, and the groove disposed between the outer region and the inner region; and wherein the first body comprises a rib in contact with the heating member, disposed to connect the inner region with the outer region.

2. The camera module of claim 1, wherein the groove is divided into a plurality of regions by the rib.

3. The camera module of claim 1, comprising a sealing member disposed between a lower surface of the inner region and the upper surface of the lens module.

4. The camera module of claim 3, wherein a sealing member coupling groove is disposed on the lower surface of the inner region, which is shaped to be recessed upwardly from the other regions so as to engage the sealing member.

5. The camera module of claim 3, wherein a staircase is disposed in an area facing the sealing member on the upper surface of the lens module.

6. The camera module of claim 1, wherein the heating member comprises: a heating part disposed between the upper part and the lens module to provide heat; a terminal part connected to the printed circuit board; and a connection part connecting the heating part and the terminal part, the heating part having a ring-shaped cross-section.

7. The camera module of claim 6, wherein a radial length of the groove is smaller than a radial length of the heating part.

8. The camera module of claim 1, comprising a second body disposed below the first body, and a lens coupling part disposed in the center of the second body to which at least a portion of the lens module is coupled.

9. The camera module of claim 8, wherein a protrusion that contacts an upper surface of the printed circuit board is disposed on a lower surface of the second body.

10. The camera module of claim 8, wherein a lens coupling portion to which the lens module is coupled is disposed on an upper surface of the second body.

11. The camera module of claim 1, wherein a hole is disposed in a center of the upper part, and
wherein an inner surface of the hole is an inclined surface.

12. The camera module of claim 1, wherein an outer surface of the side part is an inclined surface whose cross-sectional area increases downward.

13. The camera module of claim 12, wherein the first body includes a lower part disposed at a bottom of the side part,
wherein a cross-sectional area of the lower part is larger than a cross-sectional area of the upper part.

14. A camera module comprising:
a first body comprising an upper part;
a lens module disposed in the first body;
a printed circuit board comprising an image sensor facing the lens module; and
a heating member having one end thereof connected to the printed circuit board and an other end thereof disposed between the lens module and the upper part,
wherein a groove is disposed on a lower surface of the upper part facing the heating member,
wherein the lower surface of the upper part comprises an outer region, an inner region disposed on an inner side of the outer region, and the groove disposed between the outer region and the inner region; and
wherein the first body comprises a rib in contact with the heating member, disposed to connect the inner region with the outer region.

15. The camera module of claim 14, comprising a sealing member disposed between a lower surface of the inner region and an upper surface of the lens module.

16. The camera module of claim 14, wherein the heating member comprises: a heating part disposed between the upper surface and the lens module to provide heat; a terminal part connected to the printed circuit board; and a connection part connecting the heating part and the terminal part, the heating part having a ring-shaped cross-section.

* * * * *